(12) United States Patent
Chheda et al.

(10) Patent No.: US 6,934,784 B2
(45) Date of Patent: Aug. 23, 2005

(54) SYSTEMS AND METHODS FOR MANAGING-SYSTEM-MANAGEMENT-EVENT DATA

(75) Inventors: Sachin Chheda, Rosevillle, CA (US); Kevin Boyum, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 336 days.

(21) Appl. No.: 10/194,788

(22) Filed: Jul. 11, 2002

(65) Prior Publication Data

US 2004/0010647 A1 Jan. 15, 2004

(51) Int. Cl.[7] .......................... G06F 13/24; G06F 9/46; G06F 15/173
(52) U.S. Cl. ...................... 710/260; 709/224
(58) Field of Search .................. 710/48, 107, 300, 710/305, 260; 709/201, 218, 227, 225, 224; 455/418; 719/329; 714/39; 370/400, 464; 340/825; 361/600

(56) References Cited

U.S. PATENT DOCUMENTS

| | | | |
|---|---|---|---|
| 5,499,374 A | * | 3/1996 | Di Giulio et al. ............ 710/240 |
| 6,009,476 A | * | 12/1999 | Flory et al. .................. 719/324 |
| 6,256,643 B1 | * | 7/2001 | Cork et al. .................. 707/205 |
| 6,628,965 B1 | * | 9/2003 | LaRosa et al. ............... 455/557 |
| 6,779,031 B1 | * | 8/2004 | Picher-Dempsey .......... 709/224 |

OTHER PUBLICATIONS

"architecture and development of the CDF hardware event builder" by Shaw et al. (abstract only) Publication Date:Feb. 1989.*

* cited by examiner

Primary Examiner—Gopal C. Ray

(57) ABSTRACT

A method and system for system-management event detection, consolidation, reporting and storage is provided. The method and system may be used in a computer system for above-mentioned purposes. The method and system may be connected to central processing unit through a memory interface. The method and system comprises several system-management event sources that monitor system management events in the computer system. Each system-management-event source is connected to at least one system-management-event node that is in a communication connection with a system-management event-module. Each system-management-event node is operable to detect and transmit data about system-management events to the system-management-event module. The system-management-event module is able to report the occurrence of an event, is able to store data about system-management events and is operable to transmit data about system-management events to the central processing unit.

21 Claims, 2 Drawing Sheets

SYSTEMS AND METHODS FOR MANAGING-SYSTEM-MANAGEMENT-EVENT DATA

BACKGROUND OF THE INVENTION

Computer systems have become increasingly complex and distributed such that an effective Event Management System is a key part of the necessary computer-system management and administration infrastructure. The Event Management System must provide notification of the occurrence of system events, timely warning of impending problems, notification of failing processes, identification of problem areas in a system and possibly automatically fix them before service availability falls below acceptable levels. The various events are collectively known as System Management Events (SMEs). SMEs are events pertaining to the health and environment of a computer system. Examples include over or under voltage signals, hot-plug request signals, over-temperature warning signals, chassis-intrusion signals, etc. These signals are used by the management system to maintain the system health, create a log of events, and notify administrative programs in case of failure.

The sources of SME signals are often distributed throughout one or more parts of the computer systems. The signals are often on different communication architectures such as the I/O subsystem, the system processors, or even sources external to the computer system such as an external disk array. Routing each SME signal as a discrete signal to a centralized location is cumbersome and expensive due to the vast number of SME signals, and ultimately results in additional pins and connectors and larger chips in an Event Management System. Additionally, the long routes for a large number of discrete signals may result in noise and cross-talk that generate false event signals.

In the past, software-based methods for Event System Management have been employed. A microcontroller would wait for an interrupt from a remote node. Upon receiving the interrupt, the microcontroller would launch a program process to read the remote node. The shortcoming of this approach is that it adds a latency from when the event has occurred to when it is reacted upon with a significant process overhead. The present invention is directed to a system and method for addressing these and other problems in an Event Management System.

SUMMARY OF THE INVENTION

One embodiment of the invention provides a computer system that detects and stores data about SMEs. The computer system comprises a central processing unit connected to system memory. The computer system also comprises several SME nodes that monitor SMEs in the computer system. Each SME source is connected to at least one SME node that is in a communication connection with a SME module. Each SME node is able to detect and transmit data about SMEs to the SME module. The SME module is able to store data about SMEs and is able to transmit data about SMEs to the central processing unit.

Implementations of the invention in a computing environment can provide many attendant advantages. For example, scalability of the event management system is realized as more SMEs can be added by connecting SME sources to existing SME nodes or by adding additional SME nodes where clusters of SME sources currently exist.

Another advantage is a lower latency in detecting SMEs as well as an improved response time of the central processing unit. This advantage results because the central processing unit is notified of the occurrence of SMEs after all SMEs have been consolidated in the SME module.

Still another advantage is high reliability of correctly detecting and transmitting data about the occurrence of SMEs. The design will typically eliminate long traces or signal paths for individual SMEs because SME nodes can be used throughout a system. Furthermore, there is a much smaller chance of crosstalk and false signaling due to induction of noise in long signal paths.

Yet another advantage is the existence of a uniform interface for software modules. Routines in various third-party software modules often need to access data about SMEs. The process of accessing this data is simplified because of the uniform interface to the SME module.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The following discussion is presented to enable one skilled in the art to make and use the invention. Various modifications to the disclosed embodiments will be readily apparent to those skilled in the art, and the generic principles herein may be applied to other embodiments and applications without departing from the spirit and scope of the present invention as defined by the appended claims. Thus, the present invention is not intended to be limited to the embodiments shown, but is to be accorded the widest scope consistent with the principles and features disclosed herein.

Figure 1:
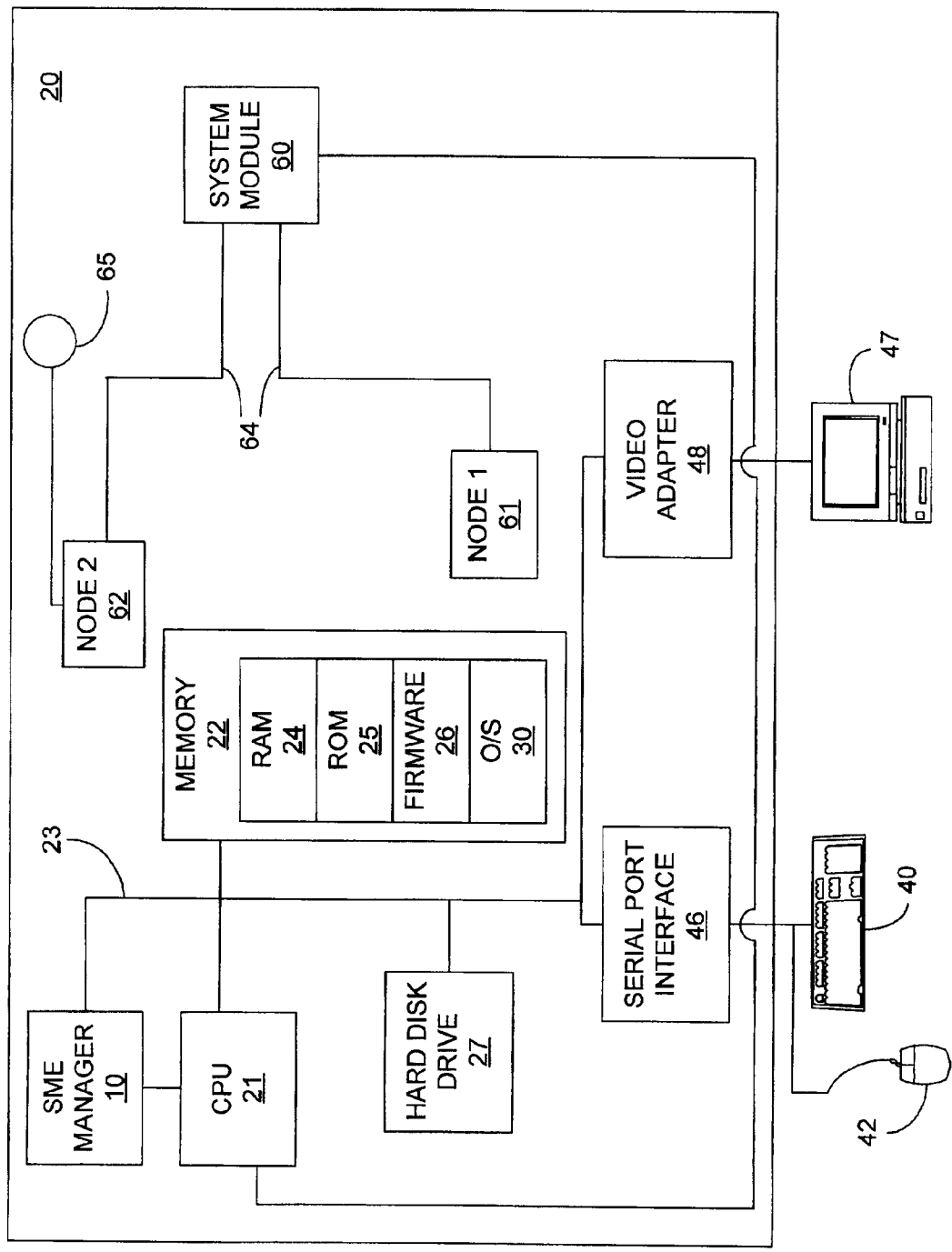
FIG. 1 is a block diagram of a general purpose computer system suitable for implementing embodiments of the invention.

FIG. 1 and the following discussion are intended to provide a brief, general description of a suitable computing environment in which the embodiments of the invention may be implemented. Those skilled in the art will appreciate that the invention may be practiced with other computer system configurations, such as, for example, hand-held devices, personal computers, servers, minicomputers, mainframe computers, multiprocessor systems, microprocessor-based or programmable consumer electronics and the like. Embodiments of the invention may also be practiced in distributed computing environments where tasks are performed by remote processing devices that are linked through a communication network.

FIG. 1 is a block diagram of a general-purpose computing device in the form of a conventional computer system 20, including a processing unit 21, a system memory 22 and a system bus 23. The system bus 23 couples the various system components including the system memory 22 to the processing unit 21. The system bus 23 may be any of several types of bus architectures including a memory bus or a memory controller, a peripheral bus, and a local bus using any of a variety of bus architectures. The system memory 22 includes read only memory (ROM) 25 and random access memory (RAM) 24. Firmware 26 containing the basic routines that help to transfer information between elements within the computer system 20 is also contained within the system memory 22. The computer system 20 may further include a hard disk drive 27 for reading from and writing to a hard disk (not shown) that is also connected to the system bus 23 through a hard disk controller (not shown). Additionally, optical drives, CD-ROM drives, floppy drives may be connected to the system bus 23 through respective drive controllers as well.

A number of program modules may be stored in the system memory 22 on the hard disk, ROM 25 or RAM 24, including an operating system 30, one or more application programs, and other data. A user may enter commands and information into the computer system 20 through input devices such as a keyboard 40 and pointing device 42. These input devices as well as others not shown are typically connected to the system bus 23 through a serial port interface 46. Other interfaces (not shown) include Universal Serial Bus (USB) and parallel ports. A monitor 47 or other type of display device may also be connected to the system bus 23 via an interface such as a video adapter 48.

The computer system 20 of FIG. 1 includes an SME module 60, a first SME node 61, and a second SME node 62. Each SME node 61 and 62 is interconnected to the SME module 60 via an interface connection 64. The SME module 60, in conjunction with the SME nodes 61 and 62 are intended to provide a means for monitoring, reporting, and logging SMEs as they occur in the computer system 20. SME nodes 61 and 62 reside physically close to the SME sources. There can be many instances of SME nodes 61 and 62 located at different places both inside and outside the computer system 20.

Various SME sources, such as, for example, a power button 65, are connected to at least one SME node 61. The SME nodes 61 and 62 monitor SME sources connected to them and provide an interrupt signal if any of the SME sources are triggered. When a SME source detects an event and generates a signal, the SME node detects this signal and sends another signal to the SME module 60 via the interface connection 64. Details of this signal will be discussed below. Although two SME nodes 61 and 62 are shown in FIG. 1, any number of SME nodes, including one, may be present in various embodiments of the invention.

Figure 2:
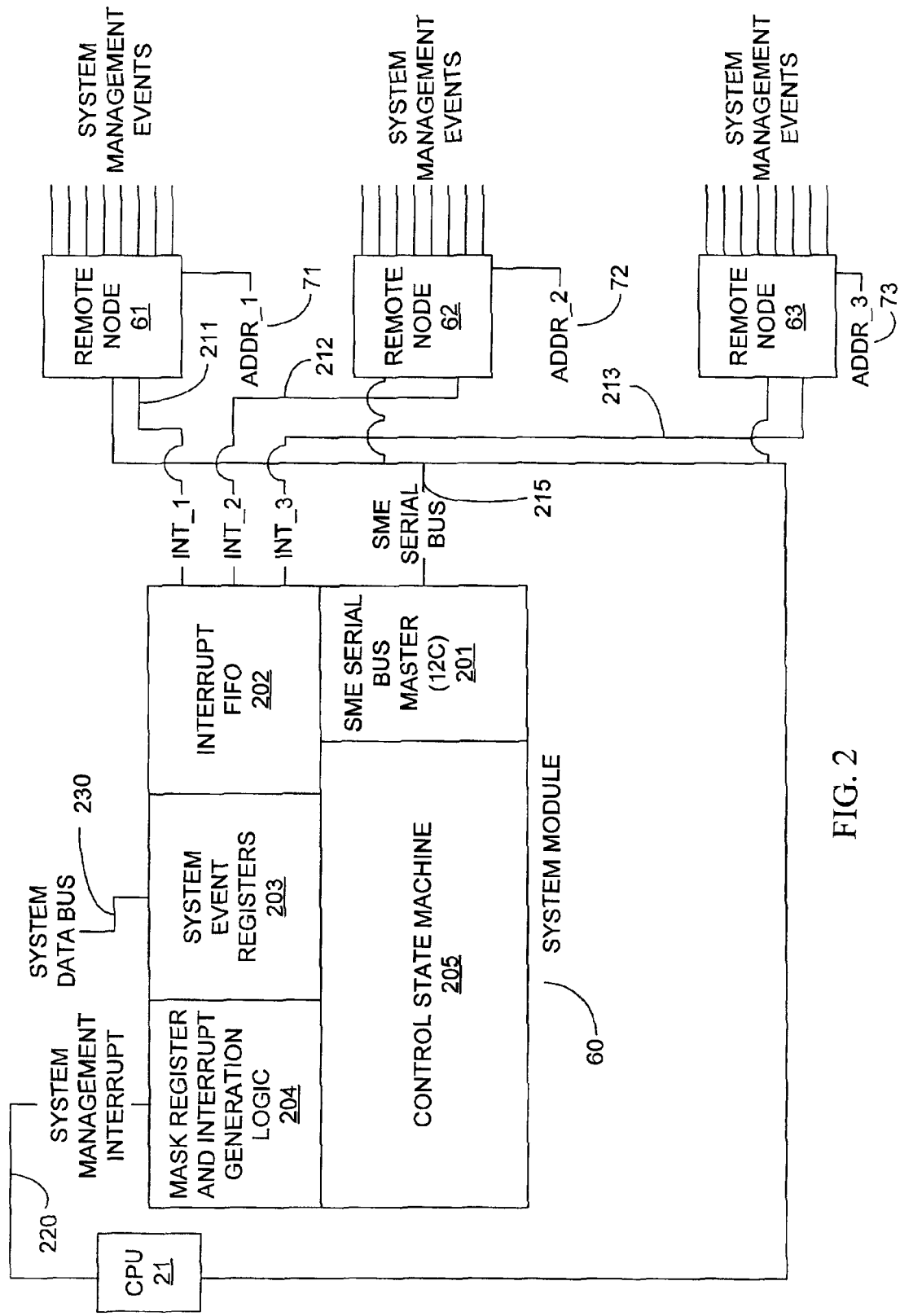
FIG. 2 is a block diagram of an embodiment of the invention.

FIG. 2 shows, in greater detail, the SME module 60 connected to three SME nodes 61, 62, and 63 and to a CPU 21 according to an embodiment of the invention. The SME module 60 comprises five smaller modules: a SME serial bus master module 201, an interrupt First In-First Out (FIFO) module 202, a SME register module 203, a register-masking module 204, and a control state machine module 205. Each of these modules may comprise soft or hard core logic and executable instructions embodied in a computer-readable medium, or any other medium or device capable of executing the functions of each particular module. The functions of each module are described below.

Each SME node 61, 62, and 63 is connected to the SME module 60 via an interface connection 64, as shown in FIG. 1. Each interface connection 64 between the SME module 60 and a particular SME node comprises at least one of two communication paths. FIG. 2 shows each communication path for each SME node 61, 62, and 63. The first SME node 61 has a dedicated interrupt INT_1 211 connected to the Interrupt FIFO module 202 of the SME module 60. Additionally, the second SME node 62 also has a dedicated interrupt INT_2 212 connected to the interrupt FIFO module 202 of the SME module 60. Finally, in the event management system in FIG. 2, the third SME node 63 has a dedicated interrupt INT_3 213 connected to the Interrupt FIFO module 202 of the SME module 60. In addition to the dedicated interrupt connections, each SME node 61, 62, and 63, is connected to an SME serial bus 215, which is connected to the SME serial bus master module 201 of the SME module 60. Serial bus communication protocol, as well as discrete interrupt communication protocol, are well known and will not be discussed further herein.

The SME module 60 is also in a communication connection with the CPU 21 of the computer system 20. FIG. 2 shows two separate communication paths, although one or both may or may not be present in various embodiments of the invention. The first communication path is a bus connection 220 between the CPU 21 and the interrupt FIFO module 202 of the SME module 60 via the a register-masking module 204. The second communication connection is a discrete interrupt connection 230 between the SME register module 203 of the SME module 60 and the CPU 21.

The SME module 60 receives signals from the SME nodes 61, 62, and 63, stores data about SMEs, and generates signals to be transmitted to the CPU 21. Each of the smaller program modules of the SME module 60 identified above are configured to accomplish these tasks.

The SME serial bus master module 201 operates as a bus master for serial communications between the SME module 60 and either the CPU 21 or any SME node 61, 62, and 63. An embodiment of the invention uses the I2C serial bus master protocol. In the I2C protocol, the communication connection physically consists of two active wires and a ground connection. The active wires are both bidirectional and are referred to as the serial data line (SDA) and the serial clock line (SCL). Each component that is connected to the SME serial bus 215 has its own unique address. For example, the first SME node 61 is connected to the SME serial bus 215 and has a unique address ADDR_1 71. Similarly the second SME node 62 has a unique address ADDR_2 72 and the third SME node 63 has its unique address ADDR_3 73. Each component can act as a receiver of SMEs and may be read by one or more bus masters. The bus master is the component that issues the commands on the SME serial bus 215. In the I2C protocol specification, it is stated that the component that initiates a data transfer on the SME serial bus 215 is considered the bus master and, at that time, all other components are regarded bus slaves.

The interrupt FIFO module 202 receives interrupt signals detected on one of several discrete interrupt lines 211, 212, or 213 from the SME nodes 61, 62, and 63. The interrupt FIFO module 202 stores the occurrence of an SME from the different SME nodes 61, 62, and 63 in order of occurrence. In this configuration, chronological data about the occurrence of SMEs can be recorded, even if several SMEs occur relatively simultaneous to each other. The interrupt FIFO module 202, in turn, generates an interrupt signal to the control state machine module 205 to indicate the occurrence of an SME. The control state machine module 205 can also be configured to periodically poll the interrupt FIFO module 202 to query the occurrence of an SME. The control state machine module 205 then requests the SME serial bus master 201 to read the SME node 61, 62 or 63 which was the source from the interrupt over the SME serial bus 215 based on the information read from the interrupt FIFO. The SME serial bus master 201 will clear the SME node 61, 62 or 63 internal registers (not shown) after reading the SME node 61, 62 or 63. When the data from the SME node 61, 62 or 63 responsible for the interrupt is received at the SME module 60, data is stored in a particular SME register within the SME register module 203.

The SME register module 203 contains several registers that contain data about the occurrence of SMEs. As was previously stated, when an SME occurs, an SME source generates a signal which is detected by an SME node 61, 62 or 63. An interrupt signal is generated by the SME node 61, 62 or 63 which is transmitted to the interrupt FIFO module 202 of the SME module 60. By storing data about SMEs in SME registers 203 in the SME module 60, information about the system events can be quickly retrieved by the CPU 21 or by any other software module via the SME serial bus 215. Since the CPU 21 or other software is notified after the collection of data about the occurrence of SMEs, less time, i.e. fewer clock cycles, are spent detecting possible SME occurrences. Additionally, a single consolidation of all SMEs provides a uniform interface for software to efficiently determine the occurrence of SMEs.

Finally, a register-masking module 204 is configurable to mask any SME register or bit within particular SME registers in the SME register module 203. A masked bit will always read a logical "1," or a logical "0" depending on the normal state of the bit. By masking a bit, certain SMEs or blocks of SMEs can be prevented from generating interrupt signals as well as prevented from being read by the CPU 21 or other software program via the SME serial bus 215. The register-masking module 204 can be set by many different agents such as, for example, firmware, system management software, operating systems.

We claim:

1. A computer-based system for managing system events comprising:
    (a) a system module operable to store data about system events;
    (b) at least one system node in a communication connection with the system module, the system node operable to transmit data about system events to the system module; and
    (c) at least one system event source in a communication connection with at least one system node, the system event source operable to generate a system event, wherein the at least one source and at least one node reside on a network device.

2. The system of claim 1 further comprising each system event source in a communication connection with more than one system node.

3. The system of claim 1, wherein the communication connection between each system node and the system module is a serial bus connection.

4. The system of claim 1 further comprising a second communication connection between each system node and the system module.

5. The system of claim 4 wherein the first communication connection between each system node and the system module is a serial bus connection.

6. The system of claim 4 wherein the second communication connection between each system node and the system module is a discrete interrupt connection.

7. The system of claim 1 further comprising a communication connection between the system module and a central processing unit.

8. The system of claim 7, wherein the communication connection between the system module and the central processing unit is a bus connection.

9. The system of claim 7 further comprising a second communication connection between the system module and the central processing unit.

10. The system of claim 9 wherein the first communication connection between the system module and the central processing unit is a bus connection.

11. The system of claim 9 wherein the second communication connection between the system module and the central processing unit is a discrete interrupt connection.

12. A computer-based system for managing system events comprising:
    (a) a system module operable to store data about system events;
    (b) at least one system node in a communication connection with the system module, the system node operable to transmit data about system events to the system module; and
    (c) at least one system event source in a communication connection with at least one system node, the system event source operable to generate a system event, wherein the communication connection between each system node and the system module is a discrete interrupt connection.

13. A computer-based system for managing system events comprising:
    (a) a system module operable to store data about system events;
    (b) at least one system node in a communication connection with the system module, the system node operable to transmit data about system events to the system module; and
    (c) at least one system event source in a communication connection with at least one system node, the system event source operable to generate a system event; and
    (d) a communication connection between the system module and a central processing unit, wherein the communication connection between the system module and the central processing unit is a discrete interrupt connection.

14. A computer-based method for monitoring system-management events, the method comprising:
    detecting a first system management event from a system-management-event source disposed in a housing at a first system node disposed in the housing;
    detecting a second system-management-event from a system-management-event source at a second system node disposed in the housing;
    sending a first signal from the first system node to a system module to indicate that a system-management event has been detected at the first system node; and
    sending a second signal from the second system node to the system module to indicate that a system-management event has been detected at the second system node.

15. The method of claim 14 further comprising logging, in a data store, system-management events that have been detected at any system node.

16. The method of claim 14 further comprising sending a signal from the system module to a central processing unit when a system-management event has been detected at any system node.

17. The method of claim 16 wherein the signal is a data on a bus.

18. The method of claim 14 wherein the first and second signals are data on a bus.

19. A computer-based method for monitoring system-management events, the method comprising:
    detecting a first system management event from a system-management-event source at a first system node;
    detecting a second system-management-event from a system-management-event source at a second system node;

sending a first signal from the first system node to a system module to indicate that a system-management event has been detected at the first system node;

sending a second signal from the second system node to the system module to indicate that a system-management event has been detected at the second system node; and sending a signal from the system module to a central processing unit when a system-management event has been detected at any system node, wherein the signal is an interrupt signal on a discrete signal path.

20. A computer-based method for monitoring system-management events, the method comprising:

detecting a first system management event from a system-management-event source at a first system node;

detecting a second system-management-event from a system-management-event source at a second system node;

sending a first signal from the first system node to a system module to indicate that a system-management event has been detected at the first system node; and sending a second signal from the second system node to the system module to indicate that a system-management event has been detected at the second system node, wherein the first and second signals are interrupt signals on discrete signal paths.

21. A computer system comprising:

(a) a central processing unit;

(b) system memory connected to the central processing unit;

(c) a plurality of system-management-event sources that monitor system-management events in the computer system;

(d) a system-management-event module operable to store data about system management events and operable to transmit data about system management events to the central processing unit; and (e) at least one system-management event node in a communication connection with the system-management-event module, each system-management-event node operable to detect and transmit data about system-management events to the system-management-event module, wherein the sources and at least one node reside on a network device.

* * * * *